United States Patent [19]

Perez

[11] 4,279,364
[45] Jul. 21, 1981

[54] COFFEE DISPENSER CONTAINED INSIDE A WALL MOUNTED BRACKET

[76] Inventor: Sergio J. Perez, 311 W. 97th St., New York, N.Y. 10025

[21] Appl. No.: 76,579

[22] Filed: Sep. 18, 1979

[51] Int. Cl.³ .............................................. B67D 5/64
[52] U.S. Cl. .................................. 222/162; 222/166; 222/181; 222/183; 222/517
[58] Field of Search ............... 222/162, 166, 181, 183, 222/515, 517, 561, 183

[56] References Cited

U.S. PATENT DOCUMENTS

| 2,580,947 | 1/1952 | Pacilio | 222/166 X |
| 2,681,169 | 6/1954 | Watson | 222/181 X |
| 3,023,935 | 3/1962 | Wagner | 222/181 X |
| 3,164,302 | 1/1965 | Indjian | 222/181 |

Primary Examiner—Robert J. Spar
Assistant Examiner—Silverberg, Fred A.

[57] ABSTRACT

A wall mounted coffee dispenser; which includes a container suspended at its upper end by bearings of a stationary bracket, so that when a lower end of the container is rearwardly pushed, it slides in a track that is abutted against the wall, and which is integral with a flat disc which normally intercepts a dispensing opening at a bottom of the container, in order that when the container is rearwardly pushed, the dispensing opening clears the disc allowing coffee to pour out.

1 Claim, 5 Drawing Figures

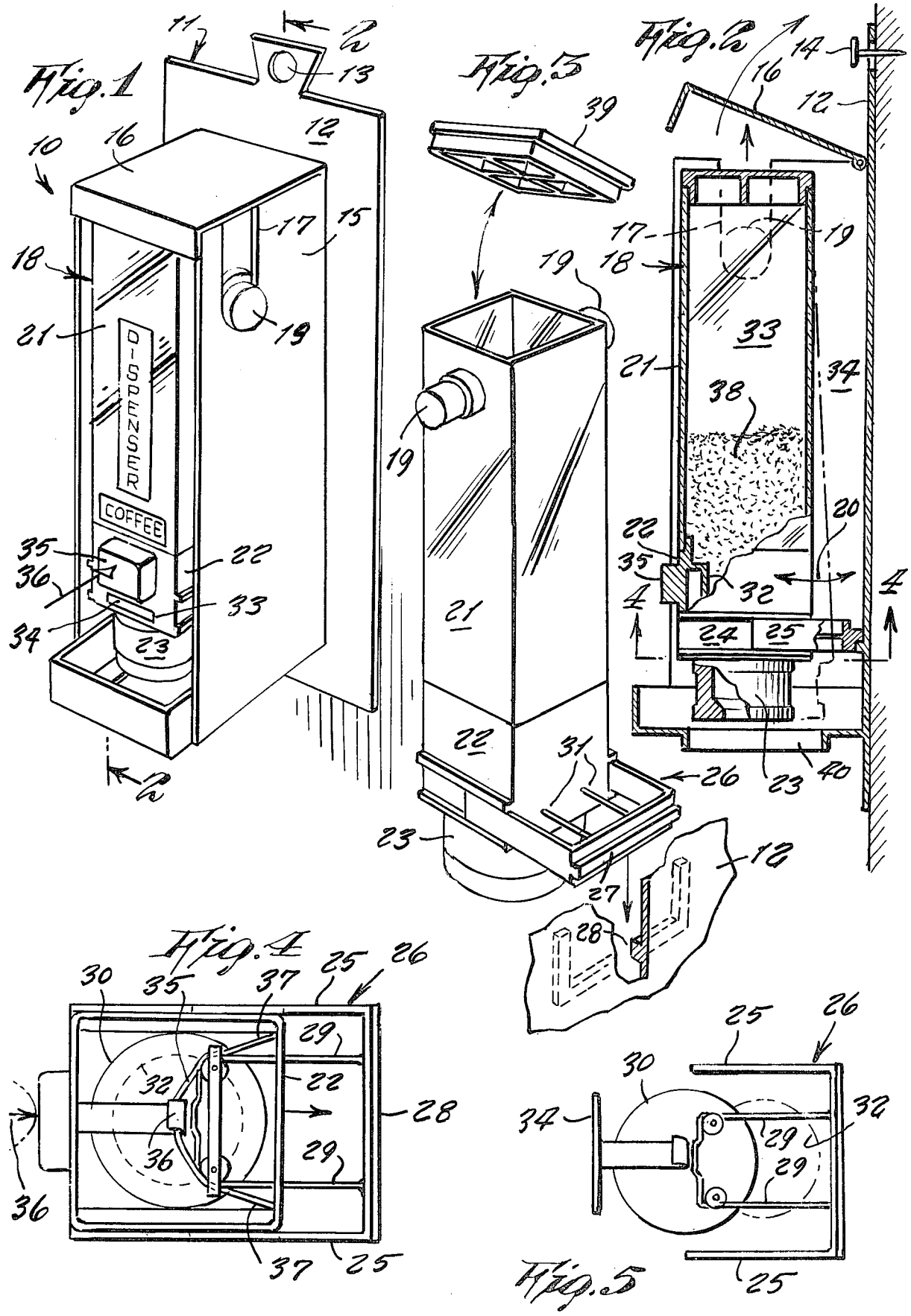

COFFEE DISPENSER CONTAINED INSIDE A WALL MOUNTED BRACKET

SUMMARY OF THE INVENTION

This invention relates generally to wall mounted coffee dispensers. It is well known that numerous wall mounted coffee dispensers have been developed in the past, and practically all requires a relatively great effort to operate; such as pushing a lever or pushing upward against a spring biased mechanism to open a dispensing hole at the bottom.

Therefore, it is a principal object of the present invention to provide a coffee dispenser that is more effortlessly operated by freely suspending an elongated coffee container from its upper end, so that very little effort is needed for pushing the lower end thereof horizontally for clearing a stationary cup that intercepts a bottom dispesing spout.

Another object is to provide a coffee dispenser which is particularly attractive in appearance in a manner that is not conventionaly to other wall mounted dispensers.

Other objects will be readily evident upon a study of the following specification and the accompanying drawings.

BRIEF DESCRIPTION OF THE DRAWING

FIG. 1 is a front perspective view of the invention.

FIG. 2 is a cross sectional view shown on line 2—2 of FIG. 1.

FIG. 3 is a rear perspective view of the coffee container.

FIG. 4 is a bottom view of the coffee container with dispensing spout removed, as viewed on line 4—4 of FIG. 2.

FIG. 5 is a similar view of the stationary component of the coffee dispenser, when the containers lower end is rearwardly pushed to dispense coffee.

PREFERRED EMBODIMENT

Referring now to the drawing in greater detail. The reference numeral 10 represents a coffee dispenser according to the present invention; wherein there is a wall mounted bracket 11 consisting of a back panel 12, with mounting holes 13 for receiving a nail or tack 14, and a box 15 integral with the back panel, the front side of the box being open. A top cover 16 is pivotable on top of the box, which exposes an upper edge of the box wherein a notch 17 is provided on opposite sides of the box.

A coffee container 18 of elongated shape having a pair of axially aligned knobs 19 near an upper end of opposite side walls of the container, that are fitted into the notches 17 of the box, in order that the container can the swing in the notches as shown by arrow 20.

The container includes a transparent tubular body 21 affixed upon an opaque plastic base 22, fitted with a downwardly dispensing spout 23 at its lower end.

A horizontal groove 24 on each opposite side of the base serves for a rail 25 of a U-shaped track 26 to slide therein; the track extending rearward where a rear cross-piece 27 thereof rests upon a ledge 28 formed on the back panel 12.

The track 26 is also integral with a pair of stiff rods 29, extending horizontally forward from the rear crosspiece 27, and a circular flat horizontal plate 30 mounted upon a forward end of the rods. The rods protrude through rear holes 31 of the base so that the baseplate is inside the base and intercepts a downward passage 32 between the spout and a coffee storage chamber 33 inside the transparent body 21.

A space 34 is provided between a rear side of the container and the back panel 12, so that the container can swing therein, as shown by phantom lines in FIG. 2; when a push-button 35 on the front of the base is pushed by a person's finger, as indicated by arrow 36.

The movement of the container respective to the stationary plate 30 causes the passage 32 to be cleared, thus allowing coffee to flow downward therethrough to the spout. For a fast and larger volume of coffee dispensing, the container is pivoted a full distance rearwardly. In such action the forward edge of the plate must necessarily protrude momentarily outward of a slot 33, on a front side of the base; the slot being normally closed by a cover 34 affixed to a front of the plate.

An elastic rubber band 35 is hooked around a hook 36 on an underside of the plate and attached at its opposite ends 37 to a rear end of the base, in order to pull the container forwardly again to a normal position after been rearwardly pushed.

To refill the container with either whole coffee beans or ground coffee 38, the cover 16 is pivoted upwardly, and a lid 39 is removed from a top of the container. An outlet opening 40 in the bottom allows dispensed coffee to fall therethrough.

It is understood that changes in the design maybe made as long as such changes comply to the scope of the appended claims.

I claim:

1. A coffee dispenser contained inside a wall mounted bracket comprising in combination, a bracket stationarily mounted on a wall; an elongated container suspended from its upper end in a box enclosing said container; said box having a rear wall and opposite side walls, and an upwardly pivotable top cover; said side walls extending forwardly farther than a front of said container, in order to fully enclose the same at each side; a lower end of said container being rearwardly pivotable toward said box rear wall; and means whereby coffee is dispensed from said container when said container is rearwardly pivoted; said means comprising a plate normally intercepting a vertical passage between a storage chamber and a downward spout of said container; a track and crosspiece abuts against said box rear wall; said track comprising rails that slide in grooves in the lower end of the container; said plate being connected to said crosspiece by rods; said plate extending horizontally through an intermediate portion of said container; said container being rearwardly slidable respective to said plate in order to open said passage; and an elastic rubber band connected between said plate and the lower end of said container urging said container into a forwardly pivoted position after being rearwardly pivoted.

* * * * *